Nov. 22, 1932.   L. J. STEPHENSON ET AL   1,888,297
CONTROL SYSTEM FOR ELECTRICAL VEHICLES AND THE LIKE
Filed April 15, 1931   3 Sheets-Sheet 1
Fig. 1
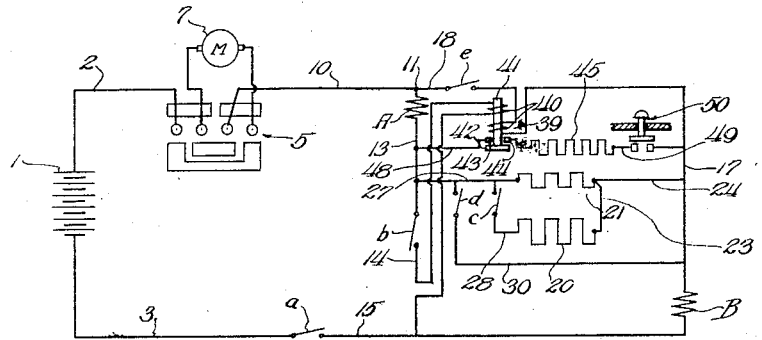
Fig. 2
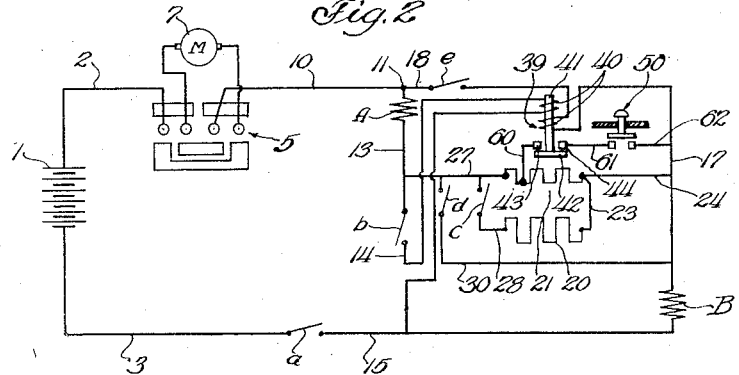
Fig. 3
|  | SPEEDS | | | | |
|---|---|---|---|---|---|
|  | 1 | 2 | 3 | 4 | 5 |
| a | ○ | ○ | ○ | ○ | ○ |
| b |  |  |  | ○ | ○ |
| c |  | ○ |  |  |  |
| d |  |  | ○ |  |  |
| e |  |  |  | ○ | ○ |
| 50 |  |  |  |  | ○ |
| 39 |  |  |  |  | ○ |
Inventors:
Leigh J. Stephenson
Herbert J. Framheim
By [signature]
Attys.

Nov. 22, 1932.      L. J. STEPHENSON ET AL      1,888,297
CONTROL SYSTEM FOR ELECTRICAL VEHICLES AND THE LIKE
Filed April 15, 1931      3 Sheets-Sheet 2

Inventors:
Leigh J. Stephenson,
Herbert J. Framhein.
By
Attys.

Patented Nov. 22, 1932

1,888,297

UNITED STATES PATENT OFFICE

LEIGH J. STEPHENSON AND HERBERT J. FRAMHEIN, OF CHICAGO, ILLINOIS, ASSIGNORS TO WALKER VEHICLE COMPANY, OF CHICAGO, ILLINOIS, A CORPORATION

CONTROL SYSTEM FOR ELECTRICAL VEHICLES AND THE LIKE

Application filed April 15, 1931. Serial No. 530,174.

The present invention relates generally to control systems for electrical devices, such as motors and the like, and has for its principal object the provision of means to secure an additional increase in velocity which may be made automatic and which is arranged to come into operation only after the motor or other device is operating at a sufficient speed or rate to warrant an attempt to further increase its operation.

The present invention is illustrated in connection with an electric truck such as the one referred to in the co-pending application of Leigh J. Stephenson, interlocking switch Serial No. 516,537, filed February 18, 1931. Occasionally trucks of this type are designed for service in connection with department store city deliveries and deliveries of bakery, dairy and similar products where there may be several stops to the block and the truck is started and stopped a comparatively great number of times during the day. For such service it is generally recognized that the slow speed electric truck possesses a number of inherent advantages.

Where, however, the service requires a truck to make one or more runs of considerable distance between deliveries with no intervening stops, such as would be the case where the delivery route is located at a considerable distance from garage or where the several routes covered by the truck service are in isolated and widely separated sections of the city, it is desirable to be able to attain a comparatively high speed over the distance leading to the delivery zone and yet retain the advantageous features of a slow speed truck.

Generally slow speed trucks designed for delivery service are provided with series motors since the frequent starts and occasional heavy loads demand a large starting torque. The characteristics of a series motor are such as to fit it quite well for delivery truck service. It will be recognized, however, that when the motor gear ratio and control scheme are arranged for efficient operation at slow speeds and during acceleration the truck would be inefficiently operated if allowed to accelerate on circuit connections that would give a relatively high speed. There are various means and methods by which an electric truck can be speeded up, but such means are inherently wrong if and when used for frequent stop service, as is met with while making deliveries.

The present invention, therefore, contemplates a new method and system of control which is especially designed to meet the demands for a delivery truck with a gear ratio and other operating characteristics which make it suitable for door to door delivery and yet one which is capable of a considerably higher speed for running to and from the delivery route without any decrease in operating efficiency. More specifically, the present invention proposes to so arrange the various controls that the high speed connection can be made only when it should properly be used and not before.

In some instances, systems have been devised in which it was left to the operator of the vehicle or other device to change to the low speed connection when the delivery zone was reached but it has been found that the operator usually continued to operate on the high speed connections with a consequent loss in efficiency due to the substantial number of stops. According to the present invention, however, the system of control is so arranged that no matter what the driver or operator may do he cannot produce the high speed connections until the truck is practically through the acceleration period and is operating at sufficient speed to warrant the high speed connections being established.

Briefly, the present invention includes switching connections to obtain the higher speed by shunting the series fields of the motor together with means effectively preventing the operation of the shunt connection for the higher speed until the motor has attained a speed sufficiently high to make this connection advisable. To this end the shunting resistance, which may include a foot push button or other manually operated device, is in series with the contacts of a magnetic lockout series switch, so that both the push button and the magnetic switch must be closed to shunt the fields.

The magnetic lockout series switch is of conventional construction and is held out magnetically while the current is above a predetermined value, the switch closing when the current drops to or below that particular value. Preferably, in addition, the series coil of the switch is placed in a portion of the circuit which carries current only in the last or highest speed which is normally obtainable in a low speed delivery truck although, under some conditions, the magnetic switch may be arranged in other portions of the operating circuits.

While we have outlined above the generic features of the present invention, it will be apparent to those skilled in the art after a consideration of the following detailed description of the preferred structural embodiment that there are other objects and advantages inherent in the present invention.

In the drawings:—

Figure 1 is a diagram illustrating the preferred form of connections;

Figure 2 is a diagram of a slightly modified form in which a portion of the starting resistance is utilized in arranging for the higher speed;

Figure 3 is a diagram showing the position of the switches in the various speeds;

Figure 4:
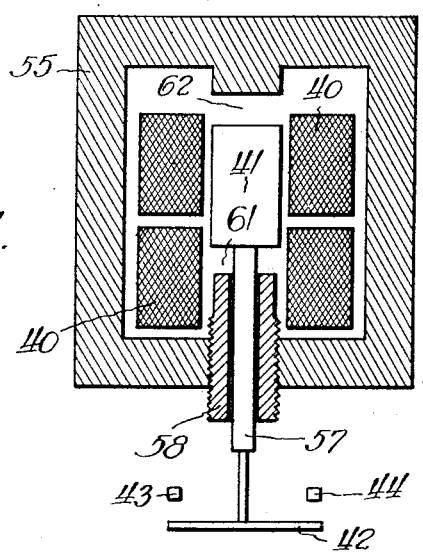
Figure 4 is a diagrammatic illustration of the series lock-out relay; and—

Figures 5 to 9, inclusive, illustrate the circuit conditions with the controller located in each of its different positions.

Referring now more particularly to Figure 1, the battery or other source of current is indicated by the reference numeral 1 and as shown has its terminals connected respectively to leads 2 and 3. The lead or conductor 2 is connected with a reversing switch, indicated in its entirety by the reference numeral 5, of the usual type, or the reversing switch 5 may be of the type shown in the co-pending application referred to above. The details of this reversing switch per se form no part of the present invention and it will therefore not be described in detail in this specification. It is sufficient to note, however, that suitable fixed and movable contacts are provided and are arranged to control the direction in which current flows through the armature 7 of the motor of the truck or other vehicle.

While we have described the armature 7 as a part of the motor of a vehicle, obviously the armature 7 is only representative of many different kinds of electrical power translating devices with which the principles of the present invention may be utilized. The reversing switch 5, when mounted in a delivery truck installation, is movable to forward and reverse positions, and also to a neutral position in which the armature 7 is entirely disconnected from the battery circuit.

The conductor 10 leads from the reversing switch 5 to a point 11 where it is in connection with field A of the motor 7. The other end of the field A is connected with the lead 13 which, in turn, is connected with a switch $b$. This switch is connected to a conductor 14, thru the upper section of the coil 40 on the magnetic lock out switch 39 to the line 15 which extends from the switch $a$ at one end of the lead 3 to the second field B of the motor 7. The field B is connected through a conductor 17, the lower section of the coil 40 on the magnetic lock out switch, the switch $e$ and the conductor 18 with the lead 10 at point 11.

A pair of starting resistors 20 and 21 are connected together at one end by the lead 23 which is connected through a conductor 24 to a point on the lead 17. The starting resistor 21 is connected directly to the conductor 13, as by a conductor 27, while the other starting resistor 20 is connected through the conductor 28 to the switch $c$, the latter being connected to the conductor 27. A shunt conductor 30 also connects the conductors 17 and 27 through the interposed switch $d$.

The structure so far described represents the usual or conventional wiring arrangement for a delivery truck of the type now in general use. While we have shown the various switches $a$, $b$, $c$, $d$ and $e$ as separated in the diagrams it is to be understood that these switches are in an actual structural embodiment either mounted on a controller drum which may be advanced manually or may be separate contactors operated by either cams or magnets energized thru a master controller through a plurality of steps for stepping up the power in order to produce the required acceleration of the motor 7. Figure 3 illustrates which of the switches are closed and which are opened in the various steps to secure the required speed.

Figure 5:
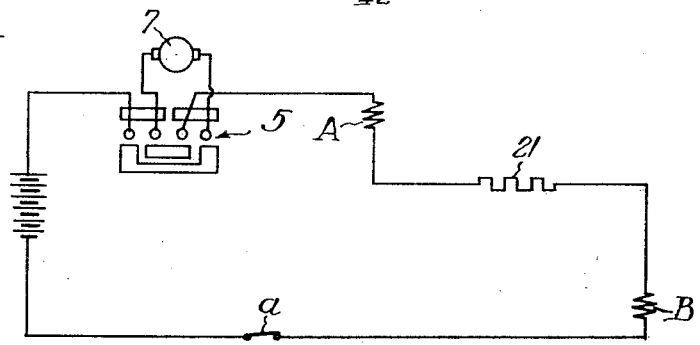
Figure 6:
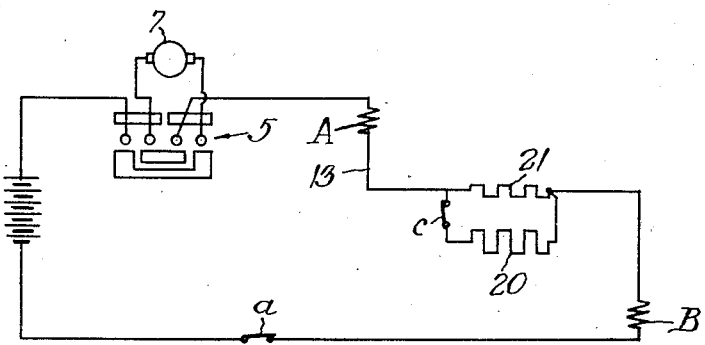
Figure 7:
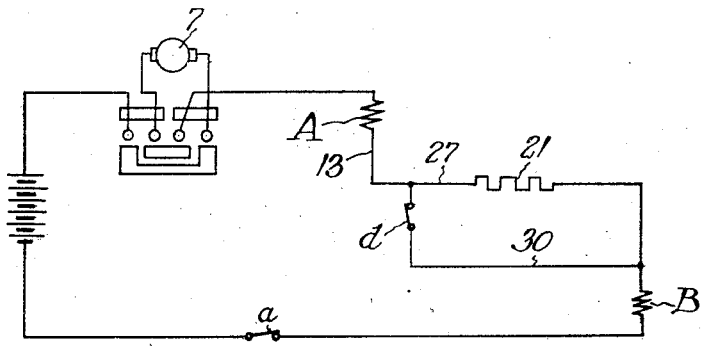

Referring now to Figures 5 to 9, inclusive, it will be seen that the circuit conditions for each speed are separately shown. Figure 5 indicates first speed. As there indicated the lowest speed is obtained when switch $a$ is closed, the other switches being opened. When so arranged the fields A and B are in series with each other and with the armature 7 and the starting resistor 21 is interposed in series with fields and the armature. Second speed (see Figure 6) is obtained by introducing the starting resistor 20 in parallel with the starting resistor 21 thus decreasing the effective resistance of this portion of the circuit and thereby causing an increased flow of current through the two serially arranged fields and the armature 7. The two resistors 20 and 21 are thrown into parallel relation by closing switch $c$ in addition to switch $a$.

Third speed (see Figure 7) is obtained by short circuiting the two starting resistors 20 and 21 while retaining the serial relation of the motor fields A and B. This is obtained, as indicated in Figure 3, by opening switch $c$ and closing switch $d$ while retaining switch $a$ closed. The path of the current in this speed is through the field B, the conductor 30, the switch $d$, the conductors 27 and 13 and the field A. Current reaches the field B through the closed switch $a$.

Figure 8:
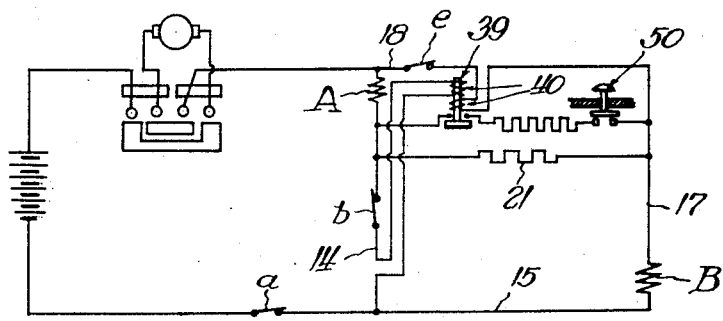

Fourth or highest normal speed is obtained by throwing the fields in parallel rather than having them arranged in series as in third speed, as best shown in Figure 8. To place the fields in parallel switches $a$, $b$ and $e$ are closed. Now the current has two paths to flow, one being through the upper coil 40 and the conductor 14, the switch $b$ and the field A, while the other path is through the conductor 15, the field B, the conductor 17, the lower coil 40, the switch $e$, and the conductor 18. When arranged in this manner the fields A and B are in parallel and hence their field strength is materially reduced so that now the motor 7 will operate at a higher speed. When arranged in this manner the fields A and B are shunted by the resistor 21, but its resistance is of considerable ohmic value and is, in actuality, ineffective.

The above description relates to securing different speeds in a delivery truck or similar device as it would be used in making door to door deliveries or frequent stops for other purposes. Usually these four speed changes are operated in stepped relation in such a way that in order to obtain the higher third or fourth speeds it is necessary to go through first and second in sequence.

Now in order to obtain an additional higher speed it is necessary to further reduce the field strength of the fields A and B, and this may be done by shunting these fields with a resistance of comparatively low ohmic value so that a material portion of the current is shunted around the fields and does not pass through them. It is desirable, and practically essential if the proper operation of the vehicle or other device is to be obtained, to provide means for shunting these fields only after the fourth or highest normal speed has been attained and the motor 7 or other device has passed through its acceleration period. To this end the present invention contemplates the provision of an automatically operating switch 39 of the type known as a magnetic lockout switch which includes a coil interposed in certain of the circuits and responsive to the current flow therethrough for operating the switches associated with the high speed shunt. Magnetic lockout switches are well known in the art. It is a switch in which the armature or moving element is moved by a current coil to make or break a contact, depending on the contact arrangement. The magnetic circuit is so designed that as the current thru the coil rises suddenly to a peak value the armature will not move, but as the current decreases to a set value the armature moves to the energized position. It may be either a plunger or clapper type switch.

While we prefer to employ a series lockout contactor, it is obvious that we may also employ an ordinary magnetic contactor in connection with the marginal series relay. Figure 4 illustrates somewhat diagrammatically, the salient features of one form of magnetic lock-out contactor. It comprises a frame structure 55, coils 40, a plunger 41 having a slender portion 57, and an adjustable bushing 58 surrounding the slender portion of the plunger. A stop member (not shown) supports the plunger in the position shown so that there is an annular air gap surrounding the portion 57 between the bushing 58 and the large portion of the plunger. There is also an air gap 62 above the plunger. Under a strong excitation the slender portion 57 of the plunger will become saturated with magnetic flux so that considerable flux will bridge the air gap 61 to exert a downward pull upon the plunger 41. This pull and the weight of the plunger tend to hold it down against the stop member above mentioned. The flux in the air gap 62 constitutes the sole lifting force upon the plunger. As the excitation is decreased the flux in the air gap 61 will rapidly diminish until it exerts little or no downward force. It is evident that the flux passing from the bushing 58 to the slender portion 57 can exert no downward pull. The pull exerted by the flux in the air gap 62, while it diminishes with the excitation, does not diminish as fast as does the downward pull exerted by the flux in the air gap 61, so that when the excitation has dropped to a predetermined value the upward pull will predominate and raise the plunger. Thus as long as the motor is accelerating it is drawing sufficient current through the coils 40 to hold down the plunger 41 and to keep the contact plate 42 which is secured to and carried by the plunger 41, away from the contacts 43 and 44. As soon, however, as the motor comes up to speed the amount of current taken thereby is reduced, whereupon the plunger 41 rises and the contact operates to close the circuit between the terminals 43 and 44. The bushing 58 is threaded into the frame member 55 so that its position therein may be easily adjusted to vary the length of the air gap 61. It will be remembered that the plunger 41 has a fixed rest position independent of the bushing 58 as determined by the stop already mentioned. Shortening the air gap 61 causes the contactor to pull up at a lower excitation.

Figure 9:
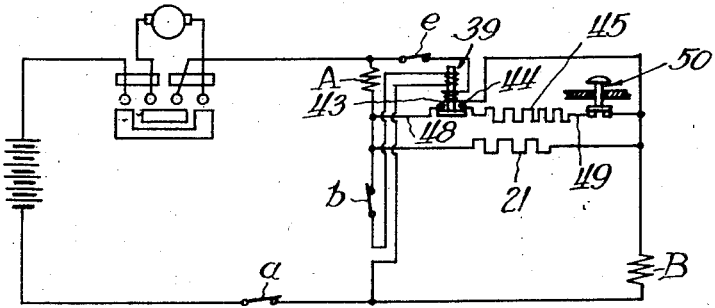

Having particular reference to Figure 9, the operation of the plunger 41 in closing the circuit at the points 43 and 44 establishes a shunt thru resistor 45 around the starting resistor 21. The ohmic value of the resistor 45 in the shunt circuit is relatively low compared to the ohmic value of the resistor 21. One end of the resistor 45 is connected to the contact 44 while the other contact 43 is connected through the conductor 48 to the conductor 13. The other end of the resistance 45 is connected through a conductor 49 and a manual or foot operated push button 50 to the conductor 17.

The operation of the circuit shown in Figure 2 is substantially the same for all practical purposes as that shown in Figure 9, with the exception that a portion of the starting resistor 21 is short circuited by the shunt connection and the other portion of the starting resistance 21 is used as the substantial equivalent of the resistor 45 of Figure 1.

The manual or foot operated switch 50 and the automatically controlled magnetic switch 39 are arranged in series so that both must be closed before the shunt around the resistor 21 can be established. Even when the switch 50 is open the current through the coils 40 of the magnetic switch 39 may be of a value sufficiently low to cause the contact plate 42 to close the circuit between the points 43 and 44 but the shunt will not be established unless the switch 50 is also closed. Conversely, the operator may close the switch 50 at any time but this will not establish the shunt circuit to weaken the fields A and B to obtain the highest speed until the magnetic switch 39 is operated, and this does not occur until the current through the coil 40 is the required minimum value. It is to be understood that the switch 50 may be either a foot or a hand operated switch of any type.

The reason for winding the coil 40 in two sections is as follows. It will be observed from Figure 1 that in fourth speed, the highest normal speed, the fields A and B are arranged in parallel relation. If the coil means 40 comprises only one section interposed in the circuit containing only one of these fields the motor would become unbalanced due to the additional resistance of the coil 40 and the larger inductance of that circuit compared to the circuit of the other field. Also, it would prevent the switch 39 from operating properly due to the fact that the other field may be carrying most of the current so that the field circuit in which the coil 40 is placed is not receiving sufficient current to hold the contact plate 42 down from the contacts 43 and 44. This is because the larger inductance of the circuit containing the single coil section causes the current in that circuit to build up so slowly that the switch does not remain open during sudden inrushes of current but has a tendency to close on a rising current. This would defeat the object of the invention.

In order to correct this we propose to divide the coil 40 into two sections, placing one in the circuit of one field and the other section in the circuit containing the other field. In this way the system remains balanced and is fully responsive to the flow of current through the field and armature circuits to prevent the establishing of the shunt circuit until the motor 7 has attained a speed sufficient to warrant the further weakening of the fields.

In Figure 2 we have shown a slightly different modified circuit, but one which, for all practical details, is substantially the same as that shown in Figure 1 and utilizes the same principles of operation. In Figure 2 instead of providing a separate low resistance field shunt for obtaining the extra high speed a portion of the starting resistor 21 is utilized by short circuiting the remainder. The resistor 21 is of comparatively large ohmic resistance and hence it is necessary to short circuit a substantial part of this resistance in order to sufficiently weaken the fields A and B to provide for the extra high speed. As shown, this short circuiting means comprises a conductor 60 connected at one end to the resistor 21 and at its other end to the contact 43 of the magnetic switch 39. Interposed between the switch 39 and the conductor 17 are the conductors 61 and 62 and the push button or manual switch 50 which is thus arranged in series with the automatically operating switch 39 as in the case of Figure 1. The other contact 44 of the magnetic switch 39 is connected to the conductor 61.

The operation of this form of the present invention is substantially the same as that outlined above. The switch 50 may be operated at any time by the operator whenever he thinks it is possible that the extra high speed may be used. When the motor 7 or other device has attained full speed in the fourth or highest normal speed the current passing through the coils 40 is sufficiently reduced to allow the plunger 41 to operate, thus closing the contacts 43 and 44 and short circuiting the greater part of the resistance 21. A greater part of the current is then shunted around the two fields A and B thus weakening them and permitting a greater speed of the motor 7 or other device.

In the operation of a truck or other device embodying the above principles, the controller upon which the switches $a$, $b$, $c$, $d$ and $e$ are mounted is advanced step by step in the usual manner until fourth speed is attained. At any time during the acceleration up to fourth speed the operator, if he desires to operate in the extra high speed, may depress the manually operated switch 50 thus closing that portion of the shunt circuit controlled thereby. However, until the controller reaches its fourth position, namely, that wherein the switches $a$, $b$ and $e$ are closed, the coils 40 of the magnetic switch 39 do not carry any current at all, and furthermore, due to the construction of the magnetic switch, the plunger 41 will not be operated until the truck has attained full speed and the current reduced to the point where the plunger 41 will be moved to close the contacts 43 and 44 thus establishing the shunt and weakening the fields A and B. This value of minimum current is so chosen that economical operation can be obtained with the fields weakened as indicated. The truck will then continue to accelerate on up to its extra high speed and will operate in that speed until the controller is moved out of the last normal notch, which is the fourth notch in the illustrated embodiment. For example, when the controller upon which the switches a, b, c, d and e are mounted is moved back out of fourth position, say into third position, switches a and d are the only ones closed and hence switches b and e being open the coils 40 receive no current at all. As a result of this the truck slows down on account of the strengthening of the motor fields.

The arrangement shown in Figure 1 where the separate shunt resistance 45 is employed is the preferred form because this shunting resistance provides a greater facility for adjustment. The switch 50 may be omitted, if desired, so that operation in the extra high or fifth speed is automatically attained without any attention on the part of the operator whatsoever, but only after the motor 7 or other device has received the proper acceleration in the fourth speed.

In some cases it may be desirable also to provide a single coil instead of the two coil sections 40 in the separate field circuits, mounting this coil directly in the armature circuits as by interposing it in the conductor 10. When arranged in this manner the switch 39 may be automatically operated at any time when the current drops to the predetermined minimum. This may not be particularly desirable in a delivery truck or similar vehicle, but the same is contemplated by the present invention as a possible construction where some other form of power translating device other than a vehicle motor is employed.

It is also to be understood that while we have preferably arranged the automatic magnetic switch 39 to be operated only after the last or highest normal speed has been attained by the main controller, such a magnetic switch can be arranged to be operated after the proper acceleration has been attained in any of the lower speeds if found to be desirable. It is furthermore to be understood that while we have disclosed a series motor the principle of automatic field weakening of our improved control system can be employed in many cases with equal advantage in motor circuits wherein a shunt motor or a compound motor is employed, although the illustrated form is preferable for trucks and the like.

We do not intend to be limited to the specific details shown and described.

What we claim and desire to secure by Letters Patent is:

1. An electrical apparatus comprising, in combination, a series motor having two field windings therefor connected in parallel and cooperating resistances shunting the windings, and means responsive to a reduced flow of current in both of said windings for short circuiting at least a portion of said resistances to reduce the strength of said field.

2. A control system for an electric motor having a field circuit and an armature circuit in series, said field circuit comprising a plurality of field windings, said system comprising manually operated switch means adapted in one position to connect said field windings in series for low speed, and in another position to connect said field windings in parallel for a higher speed, and an automatically operating magnetic switch means having an operating coil in series with each of the parallel connected field windings and a resistance adapted to parallel said field circuit to reduce the field strength whenever the current flow through said field circuit reaches a predetermined minimum value to secure a further increase in speed.

3. A control system for an electric motor having a field circuit in series with an armature circuit, said field circuit comprising a plurality of windings, said system comprising switch means adapted to connect said field windings in series for low speed, means for connecting said windings in parallel, said last named means including connections adapted to be broken when said windings are arranged in series, automatic switch means including coils in series with said windings and resistance means for shunting said windings when arranged in parallel, said automatic means being responsive to current flow of a predetermined minimum value for shunting said windings to decrease the field strength and increase the speed of the motor, and a second switch arranged in series with said automatic switch so that neither can shunt said field unless the other is closed.

4. A control system for electrical apparatus comprising, in combination, a source of power, a power translating device control means adapted to be operated for increasing the speed of said device in a plurality of steps, additional control means operable when said first mentioned control means has reached the last step, said additional control means including a magnetic switch responsive to the current drawn by said device and a second switch serially arranged with said magnetic switch.

5. A control system for an electric motor having a field, a field circuit therefor and an armature circuit in series with said field circuit, said field circuit comprising a plurality of windings, said system comprising switching means to connect said windings in series for a low speed and in parallel for a higher speed, and means for reducing the strength of said field to secure a still higher speed, said last mentioned means being operable in response to a reduction of current flow through said circuit when said windings are arranged in parallel.

6. In combination, an electric motor having an armature and a field winding connected in series, a resistance in parallel with said field winding and commutating means responsive to a reduction in the flow of current through said armature to reduce the effective value of said resistance.

In witness whereof, we hereunto subscribe our names this 10th day of April, 1931.

LEIGH J. STEPHENSON.
HERBERT J. FRAMHEIN.

CERTIFICATE OF CORRECTION.

Patent No. 1,888,297.                                November 22, 1932.

LEIGH J. STEPHENSON ET AL.

It is hereby certified that the assignee in the above numbered patent was erroneously described and specified as "Walker Vehicle Company, of Chicago, Illinois, a corporation" whereas said assignee should have been described and specified as "Walker Vehicle Company, of Chicago, Illinois, a corporation of Illinois"; and that the said Letters Patent should be read with this correction therein that the same may conform to the record of the case in the Patent Office.

Signed and sealed this 7th day of February, A. D. 1933.

(Seal)                                    M. J. Moore
                                    Acting Commissioner of Patents.